(12) United States Patent
de Lind van Wijngaarden

(10) Patent No.: US 8,750,266 B2
(45) Date of Patent: Jun. 10, 2014

(54) DUAL TRANSMISSION FOR COMMUNICATION NETWORKS

(75) Inventor: Adriaan J. de Lind van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 853 days.

(21) Appl. No.: 12/591,653

(22) Filed: Nov. 25, 2009

(65) Prior Publication Data
US 2011/0122854 A1 May 26, 2011

(51) Int. Cl.
*H04W 4/00* (2009.01)
*H04J 3/16* (2006.01)

(52) U.S. Cl.
USPC .......................................... 370/338; 370/469

(58) Field of Classification Search
USPC .......................................................... 370/338
See application file for complete search history.

(56) References Cited

U.S. PATENT DOCUMENTS

| | | | | |
|---|---|---|---|---|
| 5,613,234 A * | 3/1997 | Vella-Coleiro | ............... | 455/340 |
| 6,057,949 A * | 5/2000 | Kinstler | ................ | 398/154 |
| 6,473,467 B1 * | 10/2002 | Wallace et al. | ............... | 375/267 |
| 6,650,630 B1 * | 11/2003 | Haartsen | ................ | 370/345 |
| 7,778,226 B2 * | 8/2010 | Rayzman et al. | ............... | 370/337 |
| 7,856,047 B2 * | 12/2010 | Wang et al. | ............... | 375/132 |
| 8,019,280 B2 * | 9/2011 | Tsfaty et al. | ................ | 455/41.2 |
| 8,045,858 B2 * | 10/2011 | Truong | ................ | 398/82 |
| 8,050,289 B1 * | 11/2011 | Masterson et al. | ............... | 370/465 |
| 8,190,176 B2 * | 5/2012 | Rofougaran | ................ | 455/456.5 |
| 8,417,287 B2 * | 4/2013 | Soto | ................ | 455/553.1 |
| 2002/0024937 A1 * | 2/2002 | Barnard et al. | ................ | 370/278 |
| 2005/0198257 A1 * | 9/2005 | Gupta et al. | .................. | 709/224 |
| 2006/0154673 A1 * | 7/2006 | Khitrik et al. | ............... | 455/452.2 |
| 2007/0064684 A1 * | 3/2007 | Kottilingal | .................... | 370/355 |
| 2007/0218846 A1 * | 9/2007 | Neill et al. | .................... | 455/90.1 |
| 2007/0230373 A1 * | 10/2007 | Li et al. | .......................... | 370/267 |
| 2007/0238482 A1 * | 10/2007 | Rayzman et al. | .......... | 455/552.1 |
| 2007/0274271 A1 * | 11/2007 | Jones et al. | .................... | 370/338 |
| 2008/0069144 A1 * | 3/2008 | Yu et al. | ......................... | 370/476 |
| 2008/0220787 A1 | 9/2008 | Stanwood et al. | | |
| 2008/0220788 A1 * | 9/2008 | Stanwood et al. | ............ | 455/450 |
| 2009/0047016 A1 | 2/2009 | Bernard et al. | | |
| 2009/0156227 A1 * | 6/2009 | Frerking et al. | ............... | 455/455 |
| 2010/0021174 A1 * | 1/2010 | Truong | ........................ | 398/101 |

OTHER PUBLICATIONS

International Search Report dated Jan. 12, 2011.
Written Opinion of the International Searching Authority dated Jan. 12, 2011.
Robert C. Daniels et al.: "Multi-band Modulation, Coding, and Medium Access Control", IEEE 802.11-07/2780R1, Nov. 12, 2007, pp. 1-18.

(Continued)

*Primary Examiner* — Guang Li
(74) *Attorney, Agent, or Firm* — Harness, Dickey & Pierce

(57) ABSTRACT

A dual transmission network may use a hybrid architecture where two types of links, such as wireless and fixed, function in a parallel manner for communicating control information and data. In at least one example embodiment, an apparatus includes at least two local transceivers and a controller. The controller is connected to control the two local transceivers and configured to establish parallel first and second communication links with a remote terminal via at least one of the local transceivers. The first communication link uses a first physical layer communication protocol and the second communication link uses a second physical layer communication protocol. The second physical layer communication protocol may be different from the first physical layer communication protocol or the first and second transceivers may be configured to operate on different frequencies.

18 Claims, 9 Drawing Sheets

(56) References Cited

OTHER PUBLICATIONS

"Series J: Cable Networks and Transmission of Television, Sound Programme and Other Multimedia Signals: Security Services for Third-Generation Transmission Systems for Interactive Cable Television Services—IP Cable Modems". International Telecommunication Union; J.222.3; Nov. 2007.
"Standard for Local and Metropolitan Area Networks—Part 16: Air Interface for Fixed Broadband Wireless Access Systems". IEEE 802.16; Oct. 1, 2004.
"Series G: Transmission Systems and Media, Digital Systems and Networks: Gigabit-Capable Passive Optical Networks (GPON): Transmission Convergence Layer Specification". International Telecommunication Union; G.984.3; Mar. 2008.
"Series G: Transmission Systems and Media, Digital Systems and Networks: Very High Speed Digital Subscriber Line Transceivers 2 (VDSL2)". International Telecommunication Union; G.993.2; Feb. 2006.
"Series J: Cable Networks and Transmission of Television, Sound Programme and Other Multimedia Signals: Third-Generation Transmission Systems for Interactive Cable Television Services—IP Cable Modems: Physical Layer Specification". International Telecommunication Union; J.222.1; Jul. 2007.
"Series G: Transmission Systems and Media, Digital Systems and Networks: Gigabit-Capable Passive Optical Networks (GPON): General Characteristics". International Telecommunication Union; G.984.1; Mar. 2008.
"Series G: Transmission Systems and Media, Digital Systems and Networks: Handshake Procedures for Digital Subscriber Line (DSL) Transceivers". International Telecommunication Union; G.994.1; Feb. 2007.
"Series J: Cable Networks and Transmission of Television, Sound Programme and Other Multimedia Signals: Third-Generation Transmission Systems for Interactive Cable Television Services—IP Cable Modems: MAC and Upper Layer Protocols". International Telecommunication Union; J.222.2, vol. 1; Jul. 2007.
"Series J: Cable Networks and Transmission of Television, Sound Programme and Other Multimedia Signals: Third-Generation Transmission Systems for Interactive Cable Television Services—IP Cable Modems: MAC and Upper Layer Protocols". International Telecommunication Union; J.222.2, vol. 2; Jul. 2007.
"Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications". IEEE 802.3; 2005.
"Telecommunications and Information Exchange Between Systems—Local and Metropolitan Area Networks—Specific Requirements—Part 11: Wireless LAN Medium Access Control (MAC) and Physical Layer (PHY) Specifications". IEEE 802.11; Jun. 12, 2007.
Finn, Norman, "802.11 Station Bridges—Three Solutions to the Problem of 802.11 Stations That Are Also Bridges", Rev. 1. Jan. 2008.
Finn, Norman, "802.11 Station Bridges—Three Solutions to the Problem of 802.11 Stations That Are Also Bridges", Rev. 2. Jan. 2008.
Finn, Norman, "802.11 Station Bridges—A Way to Standardize 802.11 Non-AP Stations That Are Bridge Ports", Rev. 3. Nov. 2008.
"Series G: Transmission Systems and Media, Digital Systems and Networks: Gigabit-Capable Passive Optical Networks (GPON): Physical Media Dependent (PMD) Layer Specification". International Telecommunication Union; G.984.2; Mar. 2003.
International Preliminary Report mailed Jun. 7, 2012 for PCT/US2010/056925.

* cited by examiner

DUAL TRANSMISSION FOR COMMUNICATION NETWORKS

BACKGROUND

Communication networks, in particular, backhaul, edge and access networks, consist of fixed line networks such as copper networks, coaxial cable and optical networks, as well as wireless access networks. Fixed line networks provide point-to-point connections that generally have a high bandwidth. Such connections are not very susceptible to channel fluctuations. Wireless access networks provide point-to-multi-point connections, and they generally require less infrastructure and are easier to deploy. Such connections are typically more susceptible to channel fluctuations.

The development and standardization of new communication network technologies currently focuses on increasing bandwidth, improving quality of service (QoS) and reducing latency to better support a wide variety of applications. These applications include high-definition television, online gaming and real-time video.

Both fixed and wireless networks are widely deployed. Fixed networks often provide communications between a core network and a fixed remote terminal (RT). A local wireless network generally provides in-building connectivity. Other wireless network technologies, such as IEEE 802.16 (WiMAX), can provide wireless connectivity in a range of several hundred yards or even several miles. Accordingly, fixed and wireless networks are often connected in a serial fashion.

For example, RTs that terminate a digital subscriber line (DSL) line are often connected to a wireless router for in-house communication. Other wireless networks such as cellular networks operate independently of fixed broadband access networks.

SUMMARY

The present application discloses at least a dual transmission network. A dual transmission network may include multiple local transceivers and may use a hybrid architecture where two types of links, such as wireless and fixed, function in a parallel manner for communicating control information and data. The hybrid architecture of fixed and wireless access points exploits the strengths of combining fixed and wireless technologies to reduce link initialization time, handle instantaneous bandwidth requirements, to increase error resilience and enhance overall performance.

At least one example embodiment is directed to an apparatus including at least two local transceivers and a controller. The controller is connected to control the two local transceivers and configured to establish parallel first and second communication links with a remote terminal via at least one of the local transceivers. The first communication link uses a first physical layer communication protocol and the second communication link uses a second physical layer communication protocol. The second physical layer communication protocol may be different from the first physical layer communication protocol or the first and second transceivers may be configured to operate on different frequencies.

Another example embodiment discloses a method of operating a pair of local transceivers. The method includes transmitting information to a remote terminal from the pair of local transceivers to establish parallel first and second physical layer communication links using a first physical layer protocol and a second physical layer protocol, respectively. The second physical layer communication protocol may be different from the first physical layer communication protocol or the pair of local transceivers may be configured to operate on different frequencies. The method further includes receiving information from the remote terminal at the pair of local transceivers.

BRIEF DESCRIPTION OF THE DRAWINGS

Example embodiments will be more clearly understood from the following detailed description taken in conjunction with the accompanying drawings. FIGS. 1-8 represent non-limiting example embodiments as described herein.

FIG. 1 illustrates a local multiple transceiver unit according to an example embodiment;

FIG. 2 illustrates the local multiple transceiver unit establishing a communication link with a remote terminal according to an example embodiment;

FIG. 3 illustrates a hybrid dual medium network according to an example embodiment; and FIG. 4 illustrates a method of operating a pair of transceivers according to an example embodiment;

FIG. 6 illustrates a method of operating a pair of transceivers in response to a transmission request according to an example embodiment;

FIG. 7 illustrates a method of operating a pair of transceivers in response to a change in channel performance according to an example embodiment; and FIG. 8 illustrates a method of activating and deactivating transceivers according to an example embodiment.

DETAILED DESCRIPTION

Figure 1:
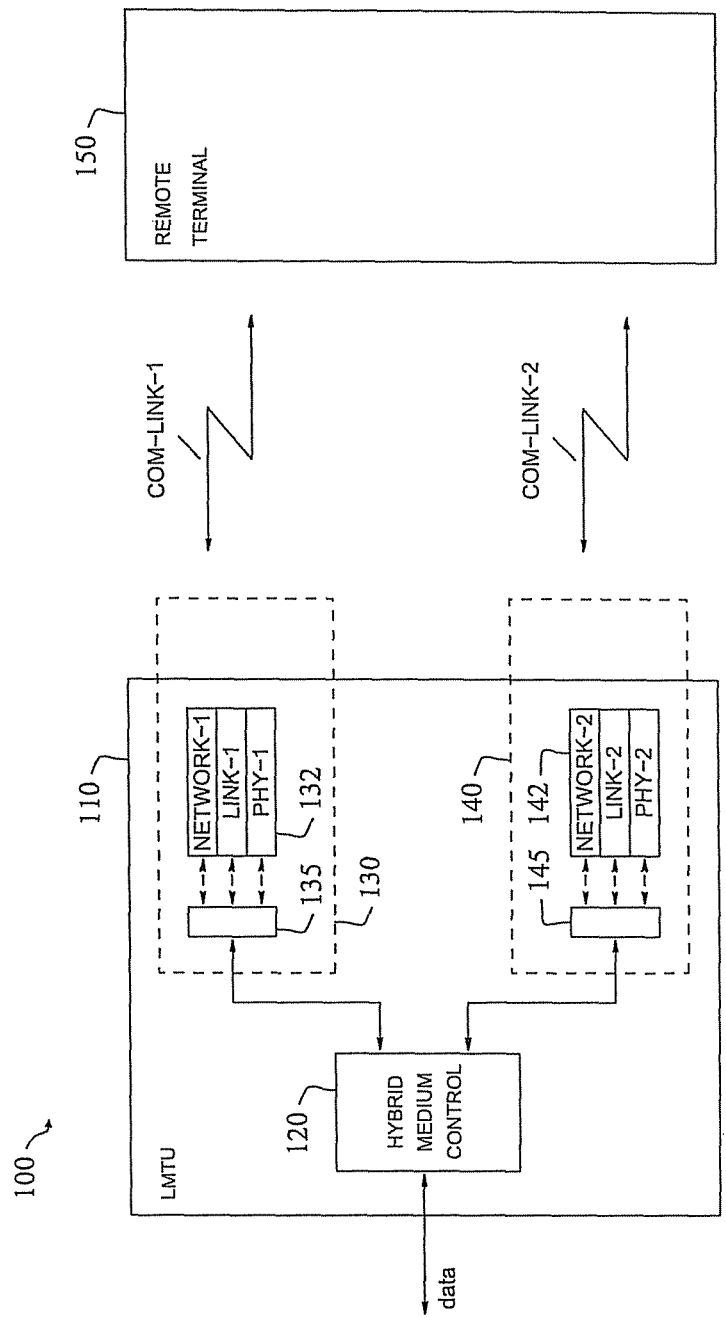

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits (ASICs), field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments are not limited by these aspects of any given implementation.

Example embodiments are directed to communication networks including a dual transmission network. At least some of the example embodiments disclose a dual transmission network including a dual transmission medium (hybrid dual medium network). The hybrid dual medium network uses a hybrid architecture where two types of links, such as wireless and fixed, function in a parallel manner for communicating control information and data. The hybrid architecture of fixed and wireless access points exploits the strengths of combining fixed and wireless technologies to reduce link initialization time, handle instantaneous bandwidth requirements, to increase error resilience and enhance overall performance. This is achieved by a joint hybrid medium controller used to operate the fixed and wireless channels in parallel.

FIG. 1 illustrates an example embodiment of a local multiple transceiver unit (LMTU) used in a network. As shown, an LMTU 110 is included in a network 100. The LMTU 110 may be an access node or a part of an access node as defined in "Very high speed digital subscriber line transceivers 2 (VDSL2)." *Series G: Transmission Systems and Media, Digital Systems and Networks, ITU G.993.2*, February 2006. The LMTU 110 is configured to communicate with a remote multiple transceiver unit (MTU) 150 (remote terminal) over at least one of first and second communication links COM-LINK-1 and COM-LINK-2, as is described in more detail below.

The LMTU 110 includes a hybrid medium controller 120 and first and second local transceivers 130 and 140. The hybrid medium controller 120 is connected to the first and second local transceivers 130 and 140. As shown in FIG. 1, data is input and output to/from the hybrid medium controller 120, however, it should be understood that data may be directly input and output to/from the first and second local transceivers 130 and 140. It should be understood that the LMTU 110 may include more than two transceivers and may operate these transceivers in parallel.

The first local transceiver 130 includes a first interface 132 and a first local controller 135. While the first local controller 135 is illustrated as separate from the first interface 132, it should be understood that the first local controller 135 may be implemented in the first interface 132. Moreover, at least some of the functionality of the hybrid medium controller 120 described herein may be implemented in the first local controller 135.

The first interface 132 may be based on a layered architecture. The structure of the layered architecture may be based on the open systems interconnection (OSI) model. As is known, the OSI model includes, from the bottom to the top, a physical layer, data link layer, network layer, transport layer, session layer, presentation layer and application layer. Depending on the transmission medium and protocol, each layer may have multiple sub-layers.

As shown, the first interface 132 includes a physical layer PHY-1, a data link layer LINK-1 and a network layer NETWORK-1. The data link layer LINK-1 includes a first media access control (MAC) sublayer. While only three layers are illustrated, one of ordinary skill should understand that more than three layers may be employed in the first interface 132. The physical layer PHY-1 is based on a first physical layer communication protocol used to establish the first communication link COM-LINK-1 with the remote MTU 150. The first communication link COM-LINK-1 may be a fixed link in a point-to-point communication, for example.

The second local transceiver 140 includes a second interface 142 and a second local controller 145. While the first local controller 145 is illustrated as separate from the first interface 142, it should be understood that the first local controller 145 may be implemented in the first interface 142. Moreover, at least some of the functionality of the hybrid medium controller 120 described herein may be implemented in the second local controller 145.

The second interface 142 may also be based on a layered architecture. As shown the second interface 142 includes a physical layer PHY-2, a data link layer LINK-2 and a network layer NETWORK-2. The data link layer LINK-2 includes a second MAC sublayer. While only three layers are illustrated, one of ordinary skill should understand that more than three layers may be employed in the second interface 142. The physical layer PHY-2 is based on a second physical layer communication protocol used to establish the second communication link COM-LINK-2 with the remote MTU 150. The second communication link COM-LINK-2 may be a fixed link in a point-to-point communication, for example. However, it should be understood that the first and second communication links COM-LINK-1 and COM-LINK-2 may be the same or different type of communication link. Thus, the network 100 may use fixed and wireless communication links, two fixed communication links or two wireless communication links.

Each physical layer PHY-1 and PHY-2 provides communication over a channel. Each link layer LINK-1 and LINK-2 provides functional and procedural means to transfer data. Each network layer NETWORK-1 and NETWORK-2 is tasked to transfer data sequences from a source to a destination. For example, a protocol such as an Internet Protocol (IP) may operate at the network layer.

The second physical layer communication protocol may be the same or different from the first physical layer communication protocol. For example, the first physical layer communication protocol may be a protocol for wireless communication and the second physical layer communication protocol may be an optical or wireline communication protocol. Thus, the first local transceiver 130 would be a wireless transceiver and the second local transceiver 140 would be an optical or wireline communication transceiver. In another example, both the first and second physical layer communication protocols may be for wireless links, but operating on different frequencies. Thus, both the first and second local transceivers 130 and 140 would be wireless transceivers and the first and second communication links COM-LINK-1 and COM-LINK-2 would be wireless communication links.

The hybrid medium controller 120 is configured to cause the first and second local transceivers 130 and 140 to share and forward low-level control information between the first and second local transceivers 130 and 140 through first and second local controllers 135 and 145, respectively. The first and second local controllers 135 and 145 provide read and controlled access to internal registers and memory regions of the first and second interfaces 132 and 142, respectively.

It should be understood that the hybrid medium controller 120 may also be configured to share and forward low-level control information between additional local transceivers. While the hybrid medium controller 120 is illustrated as a separate box from the first and second local transceivers 130 and 140, it should be understood that the hybrid medium controller 120 may be implemented in at least one of the first and second local transceivers 130 and 140. Moreover, the hybrid medium controller 120 may be implemented in at least one of the first and second local controllers 135 and 145 and include some of the functionality of the first and second interfaces 132 and 142, respectively. If the hybrid medium controller 120 is implemented in only one of the first and second local transceivers, it should be understood that the local transceiver that does not include the hybrid medium controller 120 may not include the local controller of the local transceiver.

In an example where the hybrid medium controller 120 is implemented in both the first and second local controllers 135 and 145, the first and second local controllers 135 and 145 may operate in a master-slave configuration.

The hybrid medium controller 120 may see most of the internal states of the lower layers, as well as most of the signaling through the first and second local controllers 135 and 145. For example, initialization of one of the first and second local transceivers 130 and 140 may include initial signaling to establish a link (e.g., symbol sync, frame sync, measurement of channel quality, and (instant) channel state information). This information, which is normally hidden to the higher communication layers, is made available to the hybrid medium controller by the local controllers 135 and 145. During normal operation, the hybrid medium controller 120 sees detector and packet decoder output and status. If a retransmission (e.g., using an automatic repeat request (ARQ) scheme), or incremental redundancy, as in hybrid (ARQ), is employed, the hybrid medium controller 120 may decide which of the first and second communication links COM-LINK-1 and COM-LINK-2 to use. The hybrid medium controller 120 may decide to use both of the first and second communication links COM-LINK-1 and COM-LINK-2.

If there are sudden transmission problems in one of the first and second communication links COM-LINK-1 and COM-LINK-2 (e.g., micro-cuts, strong impulse noise, deep fades), the hybrid medium controller 120 may use the other communication link to see what happened (e.g., in the case of a temporary loss of communication), aid in a retransmission, and simultaneously take over communications and aid in re-establishing the communication link. The low-level control information that is shared may vary depending on a communication stack of the first and second interfaces 132 and 142.

Depending on the protocol, low-level control information may be physical layer control information and/or data link layer control information. In the example embodiment shown in FIG. 1, the hybrid medium controller 120 has direct access to internal states and parameters at the layers of the communication stacks of the interfaces 132 and 142 through the first and second local controllers 135 and 145. Thus, a master-slave configuration may exist between the hybrid medium controller 120 and the interfaces 132 and 142.

Examples of physical layer control information include information on the type of equipment, power requirements, signal constellation information, framing format, framing parameters, forward error control (FEC) settings, as well as link quality measurements, such as the signal to noise ratio (SNR), FEC status information, hybrid Automatic Repeat-reQuest (ARQ Acknowledgements and Negative Acknowledgments) cyclic redundancy check (CRC) status information and bit error and packet error rates.

Additional examples of low-level control information are provided in "Very high speed digital subscriber line transceivers 2 (VDSL2)." *Series G: Transmission Systems and Media, Digital Systems and Networks, ITU G.*993.2, February 2006 and "Handshake procedures for digital subscriber line (DSL) transceivers." *Series G: Transmission Systems and Media, Digital Systems and Networks, ITU G.*994.1, February 2007. Examples of low-level control information in wireless communications may be provided in the IEEE 802.11 series of standards for wireless local area network communication and the IEEE 802.16 series of standards for wireless broadband access. Examples of low-level control information in passive optical networks may be provided in the IEEE 802.3 series of standards defining the physical layer and link layer of wired Ethernet, the ITU-T Recommendations G.984.1/2/3 for passive optical networks and the ITU-T Recommendations J.222.1/2/3 for coaxial cables.

The first and second local transceivers 130 and 140 are configured to share control information and, therefore, may be seen from the perspective of a user as one transmitter-receiver pair. For example, the first and second communication links COM-LINK-1 and COM-LINK-2 are considered by the user as one logical link. The hybrid medium controller 120 may connect the first and second local transceivers 130 and 140 at various levels. For example, an interface/bus may be provided from a chipset in the first transceiver 130 to a chipset in the second transceiver 140, thereby creating a physical layer connection of the physical layers PHY-1 and PHY-2.

The low-level control information may also be packed into frames and sent upward through a communication stack. The format and representation of the low-level control information may be identical or similar to the representation used internally in the protocols. For example, low-level control information received in the first local transceiver 130 may be packed into frames and sent upward through the network layer NETWORK-1 to the hybrid medium controller 120. The low-level control information may then be sent to the network layer NETWORK-2 and down the communication stack of the second interface 142 to the physical layer PHY-2. The low-level control information may also be directly transferred between the hybrid medium controller 120 and the data link layers LINK-1 and LINK-2.

The hybrid medium controller 120 is configured to establish the first and second communication links COM-LINK-1 and COM-LINK-2 with the remote MTU 150 in parallel, since the hybrid medium controller 120 has access to the low-level control information. Furthermore, while the first and second communication links COM-LINK-1 and COM-LINK-2 are each illustrated as single links, it should be understood that the first and second communication links COM-LINK-1 and COM-LINK-2 may include multiple points (e.g., nodes on a network) and protocols from the LMTU 110 and the remote MTU 150.

Figure 2:
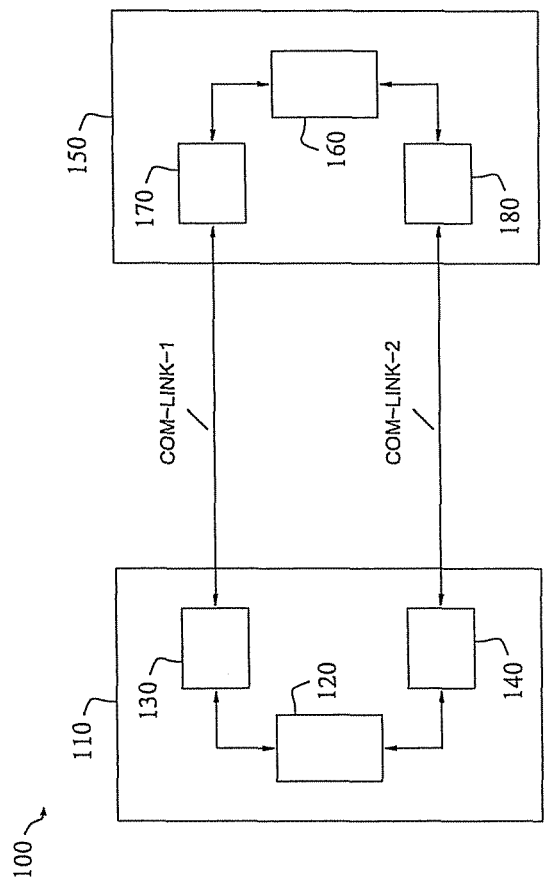

FIG. 2 illustrates an example embodiment of establishing the second communication link COM-LINK-2. For example, when the second communication link COM-LINK-2 is being established, the hybrid medium controller 120 and the remote MTU 150 exchange low-level control information through the first local transceiver 130 and a corresponding first remote transceiver 170 of the remote MTU 150. More specifically, the low-level control information is forwarded from the second local transceiver 140 to the hybrid medium controller 120. The hybrid medium controller 120 shares the low-level control information with the first local transceiver 130 to transmit the low-level control information over the first communication link COM-LINK-1 that is already established with the remote MTU 150. When the first remote transceiver 170 receives the low-level control information, the first remote transceiver 170 forwards the low-level control information to a second hybrid medium controller 160 which then forwards the low-level control information to a second remote transceiver 180. The second remote transceiver 180 and the second local transceiver 140 may then establish the second communication link COM-LINK-2 with the low-level control information.

Therefore, the low-level control information may be exchanged over the first communication link COM-LINK-1 to improve speed, reduce latency and/or save bandwidth over the second communication link COM-LINK-2 while the second communication link COM-LINK-2 is being established. The availability of the first communication link COM-LINK-1 allows for a quick set up of the second communication link COM-LINK-2 because the low-level control information that is generally exchanged during initialization does not need to be ultra robust (as long as the first communication link COM-LINK-1 provides reliable communication). The second hybrid medium controller 160 may be the same as the hybrid medium controller 120. Therefore, a description of the second hybrid medium controller 160 will be omitted for the sake of clarity and brevity.

Consequently, a communication session over the second communication link COM-LINK-2 may be controlled using the low-level control information. For example, the low-level control information may be used by the hybrid medium controller 120 to initialize the communication session over the second communication link COM-LINK-2, aid in updating communication parameters and selectively schedule transmission of information between the first and second local transceivers 130 and 140 to corresponding first and second remote transceivers 170 and 180.

As a result of sharing the control information, initialization times of a communication session may be decreased. For example, the hybrid medium controller 120 provides the first local transceiver 130 with low-level control information when the second communication link COM-LINK-2 is being established. Portions of an initialization procedure, such as a handshake, may be simplified when establishing the second communication link COM-LINK-2 since the low-level control information can be transmitted over the already established first communication link COM-LINK-1.

For example, the network 100 may be implemented using handshake procedures for DSL transceivers as specified in the ITU-T recommendation G.994.1 (02/2007), "Handshake procedures for digital subscriber line (DSL) transceivers". An xDSL transceiver at each end of the line (e.g., the first local transceiver 130 and the first remote transceiver 170) includes a handshake transceiver unit (HSTU) (not shown), which negotiates modes of operation on behalf of one or more xDSL terminal units. A specific signaling scheme is prescribed that uses a mandatory carrier set that is associated to a specific xDSL mode of operation. The mandatory carrier sets for the upstream and downstream direction typically consist of 2-3 tones that have prescribed maximum power levels. In addition, the tolerance of the symbol rate and carrier frequencies is quickly tightened. If the first communication link COM-LINK-1 is not available, the regular protocol is executed as defined. However, in the presence of the first communication link COM-LINK-1, the communication parameters that are initially exchanged can be transferred much more quickly and reliably.

According to G.994.1, only the carrier set that is specified in G.994.1 can be used for signaling, and it is prescribed that all tones within a carrier set are simultaneously modulated with the same data bits using differentially encoded binary phase shift keying (DPSK). It follows that the data rate is low, e.g., about 500-800 bits per second per carrier set, including a substantial amount of overhead. The information that is being exchanged may include a capabilities list, a mode request, a mode select, a mode proposal, various kinds of acknowledgement signals, negative acknowledgement signals, and message request signals. The use of carrier sets with very few tones (i.e., 2-3 tones) and the symbol rate and carrier frequency requirements make the system prone to failure, especially when the tones used in the carrier set are affected by excessive noise, e.g., due to radio frequency interference, crosstalk, or impulse noise. The first communication link COM-LINK-1 can immediately exchange the relevant information at a much higher rate and at a much higher reliability, and also speed up and effectively simplify the elaborate acknowledgement schemes.

By establishing the second communication link COM-LINK-2 with the low-level control information transmitted over the first communication link COM-LINK-1, the hybrid medium controller 120 may use the first communication link COM-LINK-1 or the second communication link COM-LINK-2 to exchange control information that would otherwise take up bandwidth in a communication session or inhibit too much latency. For example, a first communication session over the first communication link COM-LINK-1 may be established. A second communication session may be established by the hybrid medium controller 120 over the second communication link COM-LINK-2 to exchange or update communication parameters regarding the first communication link COM-LINK-1, such as channel characterics/requirements information, handling of transmission errors and acknowledgments.

Moreover, sharing of the low-level control information may mitigate low-level transmission problems and connectivity problems. For example, when a communication session over the first communication link COM-LINK-1 experiences a change in performance (e.g., the first communication link COM-LINK-1 breaks down), the hybrid medium controller 120 may use the second communication link COM-LINK-2 to inform the remote MTU 150 that the communication session is down and needs to be restored. Consequently, the low-level control information used by the hybrid medium controller 120 to establish the first communication link COM-LINK-1 may be transmitted by the hybrid medium controller 120 over the second communication link COM-LINK-2 to bring back up the first communication link COM-LINK-1 and the communication session. Moreover, status requests may be transmitted through the second communication link COM-LINK-2 to determine the problem. In the case of channel errors, the second communication link COM-LINK-2 may mitigate the effects of decreased throughput and quickly convey ARQ messages.

The hybrid medium controller 120 also uses the first and second communication links COM-LINK-1 and COM-LINK-2 to improve data transfer by providing a wider range of scheduling options and diversity. For example, if the amount of data being transferred between the LMTU 110 and the remote MTU 150 is low (e.g., above a performance threshold), the hybrid medium controller 120 may select one of the first and second communication links COM-LINK-1 and COM-LINK-2 to establish a communication session. However, when a large burst of data is to be transmitted (e.g., the current communication capability is below a performance threshold), the hybrid medium controller 120 may establish a second communication session over the unselected communication link of the first and second communication links COM-LINK-1 and COM-LINK-2. Moreover, the hybrid medium controller 120 may establish communication sessions over the first and second communication links COM-LINK-1 and COM-LINK-2 based on the latency requirements and quality of service of the type of information being transferred. Therefore, the hybrid medium controller 120 manages bandwidth and/or latency requirements by establishing communication sessions over the first and second communication links COM-LINK-1 and COM-LINK-2 using the low-level control information.

The hybrid medium controller 120 selectively schedules transmission of information over the first and second communication links COM-LINK-1 and COM-LINK-2. The hybrid medium controller 120 may be in one of multiple stages which include: no communication sessions over the first and second communication links COM-LINK-1 and COM-LINK-2 are active; a communication session over one of the first and second communication links COM-LINK-1 and COM-LINK-2 is active; and both communication sessions over both of the first and second communication links COM-LINK-1 and COM-LINK-2 are active. It should be understood that the hybrid medium controller 120 may control the first and second local transceivers 130 and 140 such that an active transceiver (e.g., one of the first and second local transceivers 130 and 140) may be in a sleep mode (e.g., no or little information sent) and may rapidly transfer information when activated without initializing the active transceiver.

For example, if both the first and second local transceivers 130 and 140 are inactive and/or switched off, the hybrid medium controller 120 may select which of the first and second local transceivers 130 and 140 to activate to establish a communication link with the remote MTU 150. If the second local transceiver 140 is selected and traffic over a communication session over the second communication link COM-LINK-2 is high (e.g., the communication capability is below a performance threshold), the hybrid medium controller 120 may activate the first local transceiver 130. Low-level control information may be transmitted over the second communication link COM-LINK-2 to establish the first communication link COM-LINK-1. Once the first communication link COM-LINK-1 is initialized, a second communication session may be established. If traffic being transferred over the communication sessions on the first and second communication links COM-LINK-1 and COM-LINK-2 is low (e.g., the communication capability is above a performance threshold), the hybrid medium controller 120 may decide to terminate one of the communication sessions and put one of the first and second communication links COM-LINK-1 and COM-LINK-2 in a sleep mode.

MAC data (as a part of the data link layer LINK-1 or LINK-2) may be provided in the low-level control information. By obtaining the MAC data, the hybrid medium controller 120 knows of detailed, real-time usage statistics such as delays, required latency and quality of service of incoming data. The hybrid medium controller 120 may employ a set of performance thresholds as well as different cost functions to select appropriate channel(s) and duplicate some data across the first and second communication links COM-LINK-1 and COM-LINK-2 to ensure quality and low delay. Based on the detailed, real-time usage statistics, the hybrid medium controller 120 decides whether the first and/or second communication links COM-LINK-1 and COM-LINK-2 should be put in a sleep/ standby mode or active mode.

Figure 3:
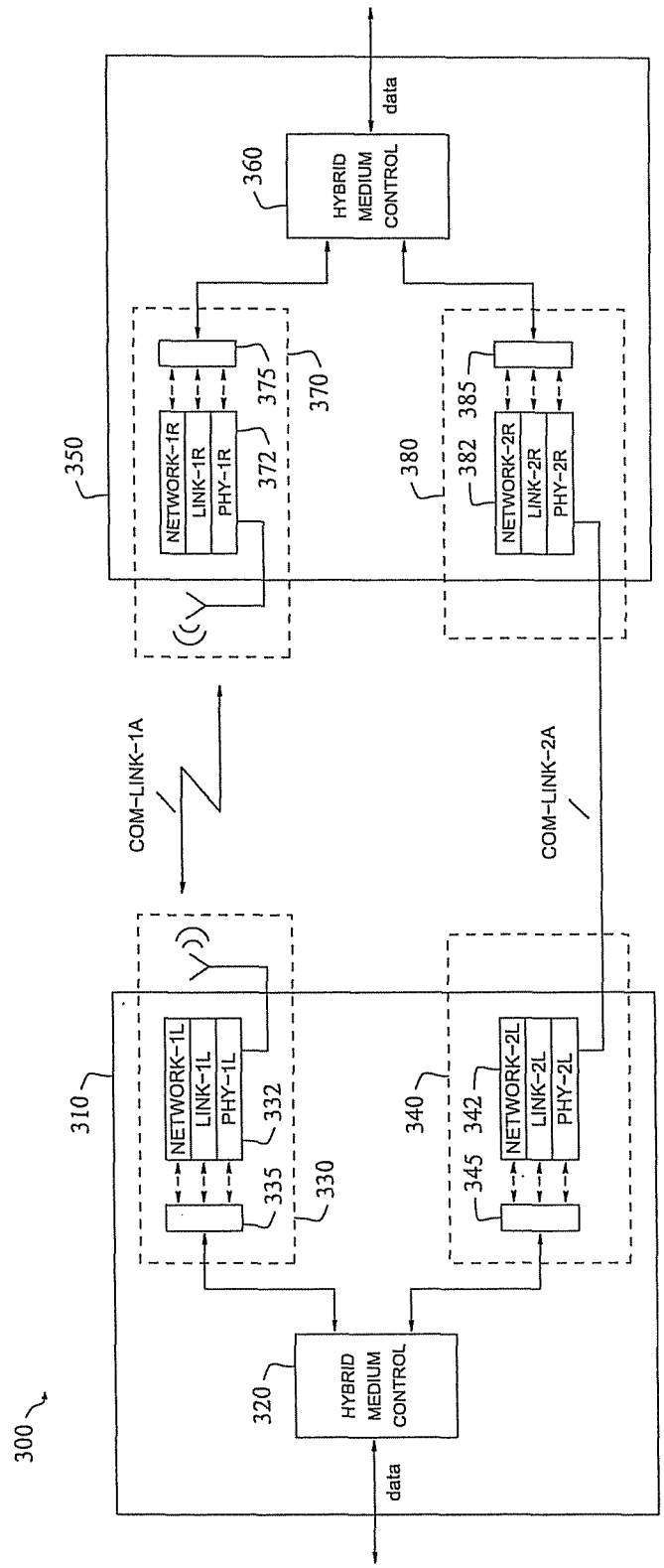

FIG. 3 illustrates an example embodiment of a hybrid dual medium network including a LMTU. As shown, a hybrid dual medium network 300 includes an LMTU 310 that may be connected to at least one remote MTU 350 through a wireless communication link COM-LINK-1A and a fixed medium communication link COM-LINK-2A. The hybrid dual medium network 300 may be a DSL-based network such as very high speed DSL (VDSL). However, the hybrid dual medium network 300 may be based on other access technologies.

The LMTU 310 may include a digital subscriber line access multiplexer (DSLAM). One of ordinary skill in the art would understand that the LMTU 310 may be connected to more than one remote MTU 350 through other communication links.

The LMTU 310 includes a hybrid medium controller 320 coupled between first and second local transceivers 330 and 340. The first and second local transceivers 330 and 340 include a wireless interface 332 and a fixed access physical interface 342, respectively. The first and second local transceivers 330 and 340 also include first and second local controllers 335 and 345, respectively. The first and second local controllers 335 and 345 provide read and controlled access to internal registers and memory regions of the wireless interface 332 and the fixed access physical interface 342, respectively.

The remote MTU 350 includes a hybrid medium controller 360 coupled between first and second remote transceivers 370 and 380. The first and second remote transceivers 370 and 380 include a wireless interface 372 and a fixed access physical interface 382, respectively. The first and second remote transceivers 370 and 380 also include first and second remote controllers 375 and 385, respectively. The first and second remote controllers 375 and 385 provide read and controlled access to internal registers and memory regions of the wireless interface 372 and the fixed access physical interface 382, respectively.

The hybrid medium controllers 320 and 360 are configured to perform the functions of the hybrid medium controller 120 as described above through the first and second local controllers 335, 345 and first and second local controllers 375, 385, respectively. Therefore, for the sake of brevity and clarity, only the additional features of the hybrid medium controllers 320 and 360 will be described. Moreover, the local and remote transceivers 330, 340, 370 and 380 are configured to perform the functions of the local transceivers 130 and 140 as described above. Therefore, for the sake of brevity and clarity, only the additional features of the local and remote transceivers 330, 340, 370 and 380 will be described.

As shown in FIG. 3, data is input and output to/from the hybrid medium controllers 320 and 360, however, it should be understood that data may be directly input and output to/from the transceivers 330, 340, 370 and 380.

The first local transceiver 330 and the first remote transceiver 370 are configured to communicate over a wireless communication link COM-LINK-1A. The second local transceiver 340 and the second remote transceiver 380 are configured to communicate over a fixed medium communication link COM-LINK-2A through a fixed medium such as copper wire, coaxial cable or optical fiber.

As shown in FIG. 3, each of the interfaces 332, 342, 372 and 382 includes a physical layer PHY-1L, PHY-2L, PHY-1R and PHY-2R, a link layer LINK-1L, LINK-2L, LINK-1R and LINK-2R, and a network layer NETWORK-1L, NETWORK-2L, NETWORK-1R and NETWORK-2R. Each data link layer LINK-1L, LINK-1R, LINK-2L and LINK-2R includes a media access control (MAC) sub-layer. One of ordinary skill in the art should understand that the interfaces 332, 342, 372 and 382 may include additional layers such as additional layers in the Open Systems Interconnection Reference (OSI) Model.

Each physical layer PHY-1L, PHY-2L, PHY-1R and PHY-2R provides communication over a link. For example, the physical layers PHY-1L and PHY-1R of the wireless interfaces 332 and 372 allow the LMTU 310 and the remote MTU 350 to communicate over the wireless communication link COM-LINK-1A. Each link layer LINK-1L, LINK-2L, LINK-1R and LINK-2R provides functional and procedural means to transfer data. Each network layer NETWORK-1L, NETWORK-2L, NETWORK-1R and NETWORK-2R is tasked to transfer data sequences from a source to a destination. For example, the Internet Protocol (IP) may operate at the network layer.

Communication sessions between the hybrid medium controllers 320 and 360 in the hybrid dual medium network 300 may be established over the wireless communication link COM-LINK-1A and the fixed medium communication link COM-LINK-2A. For example, communication sessions may be established between the second local transceiver 340 and the second remote transceiver 380 as well as between the first local transceiver 330 and the first remote transceiver 370 using the hybrid medium controllers 320 and 360.

A physical media dependent (PMD) sub-layer, which is included in each physical layer PHY-1L, PHY-2L, PHY-1R and PHY-2R, is responsible for symbol timing generation and recovery, encoding and decoding, and modulation and demodulation. The PMD may also include echo cancellation and line equalization.

A next higher sub-layer in the physical layers PHY-1L, PHY-2L, PHY-1R and PHY-2R is the physical media specific transmission convergence (PMS-TC) sub-layer, which provides framing and frame synchronization functions, as well as forward error correction, error detection, interleaving and de-interleaving, scrambling and descrambling functions. The PMS-TC also provides an overhead channel to exchange control information.

As an example, the PMD and PMS-TC for a digital subscriber line system communicating over twisted pair copper lines are defined in "Very high speed digital subscriber line transceivers 2 (VDSL2)." *Series G: Transmission Systems and Media, Digital Systems and Networks, ITU G*.993.2, February 2006. Other fixed access systems have similar PMD and PMS-TC structures. Thus, for the sake of clarity and brevity, the PMD and PMS-TC will not be described in greater detail.

An initialization procedure includes a handshake procedure between the hybrid medium controllers 320 and 360, followed by a channel discovery phase, a training phase and a channel analysis and an exchange phase. For example, the hybrid medium controller 320 may instruct the second local transceiver 340 to establish the fixed medium communication link COM-LINK-2A with the second remote transceiver 380. During this process, the low-level control information is exchanged.

The availability of the wireless communication link COM-LINK-1A shortens the initialization procedure between the hybrid medium controllers 320 and 360 when establishing the fixed medium communication link COM-LINK-2A. For example, if the fixed medium communication link COM-LINK-2A was a stand-alone link, the hybrid medium controller 320 would communicate initialization data between the second local transceiver 340 and the second remote transceiver 380 over the fixed medium communication link COM-LINK-2A while the fixed medium communication link COM-LINK-2A is still being established. Usually very robust, low-rate techniques are used to communicate this. However, since the wireless communication COM-LINK-1A may be available, initialization data between the second local transceiver 340 and the second remote transceiver 380 may be exchanged over the wireless communication link COM-LINK-1A that is established while the fixed access communication link COM-LINK-2A is being established.

Furthermore, the wireless communication link COM-LINK-1A may act as a reliable back-channel for synchronization purposes and for the exchange of training measurements and parameters. For example, when the hybrid medium controllers 320 and 360 are exchanging information in a communication session over the fixed access communication link COM-LINK-2A (or wireless communication link COM-LINK-1A), the start-up protocols for the wireless communication link COM-LINK-1A (or fixed access communication link COM-LINK-2A) may be shortcut since the low-level control information is available to the hybrid medium controllers 320 and 360. Wireless feedback may be employed in the hybrid dual medium network 300 to speed up channel acquisition procedures to measure crosstalk between active lines and to transfer the measurements to a crosstalk estimation module.

The hybrid medium controller 360, the first remote transceiver 370 and the second remote transceiver 380 operate in the same manner as the hybrid medium controller 320, the first local transceiver 330 and the second local transceiver 340. Therefore, for the sake of brevity and clarity, the hybrid medium controller 360, the first remote transceiver 370 and the second remote transceiver 380 will not be described in greater detail.

While the hybrid medium controller 320 is illustrated outside of the first and second local transceivers 330 and 340, it should be understood that the hybrid medium controller 320 may be implemented in at least one of the first and second local transceivers 330 and 340. Moreover, while the hybrid medium controller 360 is illustrated outside of the first and second remote transceivers 370 and 380, it should be understood that the hybrid medium controller 360 may be implemented in at least one of the first and second remote transceivers 370 and 380.

For example, the hybrid medium controller 320 may be implemented in the second local controller 345 of the second local transceiver 340. If the first communication link COM-LINK-1A is established, messages intended for transmission through the second communication link COM-LINK-2A may be rerouted from the fixed access physical interface 342, through the second local controller 345, through the first local transceiver 330 and over the first communication link COM-LINK-1A to the first remote transceiver 370. In this example, the hybrid medium controller 360 is implemented in the second remote controller 385 to allow access to the internal registers of the fixed access physical interface 382. Therefore, the second remote controller 385 may extract and inject information from and into the protocol stack of the fixed access physical interface 382. Therefore, in this example, the first local and remote transceivers 330 and 370 may be implemented as standard transceivers and not include their respective local controllers 335 and 375.

In an example where the hybrid medium controller 320 is implemented in both the first and second local controllers 335 and 345, the first and second local controllers 335 and 345 may operate in a master-slave configuration. In an example where the hybrid medium controller 360 is implemented in both the first and second remote controllers 375 and 385, the first and second remote controllers 375 and 385 may operate in a master-slave configuration.

Figure 4:
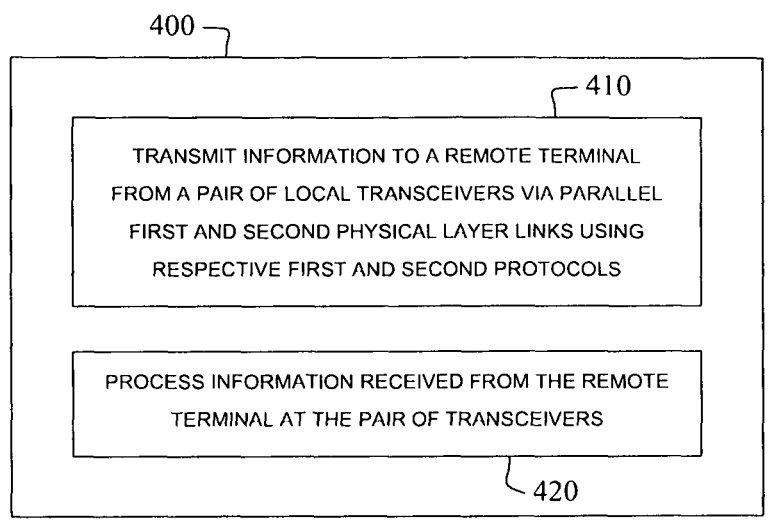

FIGS. 4-8 illustrate methods of operating a pair of local transceivers according to example embodiments. The methods of FIGS. 4-8 may be implemented by an LMTU including a hybrid medium controller such as one of the hybrid medium controllers 120, 160, 320 and 360. While FIG. 4 is implemented from the perspective of the LMTU, it should be understood that the same method may be performed by the remote terminal, which may be the same as any one of the remote terminals described above with reference to FIGS. 1-3. Therefore, the hybrid medium controller described below with reference to FIGS. 4-8 should be understood to have at least the functionality of the hybrid medium controllers 120, 160, 320 and 360. FIG. 4 illustrates a method 400 of operating a pair of local transceivers according to an example embodiment. At step 410, the hybrid medium controller transmits information (both control and data) from a pair of local transceivers via parallel first and second physical layer links using respective first and second protocols. At step 420, the hybrid medium controller processes received information from the remote terminal at the pair of local transceivers. Illustrative examples of operations performed in step 410 and step 420 are discussed in more detail below with reference to FIGS. 5-8.

Figure 5A:
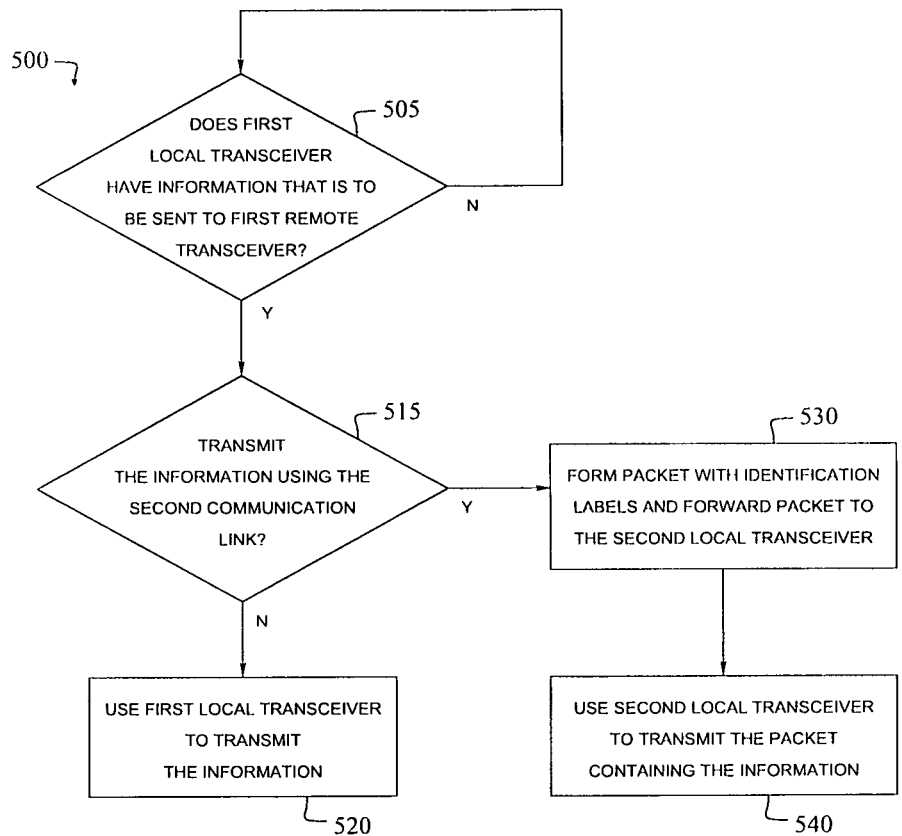
FIG. 5A illustrates a method of operating a pair of transceivers in response to information that is to be transmitted to a remote terminal according to an example embodiment.

FIG. 5A illustrates an example embodiment of step 410 illustrated in FIG. 4. More specifically, FIG. 5A illustrates a method 500 of operating the pair of local transceivers in response to a transmission request internal to a first local transceiver. The transmission request may relate to transmitting information, e.g., internal control information, user data, or information requested by the local or remote hybrid medium controller. In step 505, the hybrid medium controller determines whether the first local transceiver has information that is to be sent to the first remote transceiver. If this is the case, the method proceeds to step 515, where the transmission requirements of the information are inspected and the most suitable communication link is selected based on available performance indicators for the available channels.

The performance indicators may be data driven and/or based on channel conditions. Local controllers (e.g., the first and second local controllers 335 and 345) of the local transceiver and a second local transceiver connected to the hybrid medium controller may provide access to both regular data channels and control channels. Each of these channels may have different link performance indicators such as different robustness, data rates, reliability (e.g., bit error rate) and/or latency.

If the communication through a channel over the first communication link is to be done, the method proceeds to step 520 and uses the first local transceiver to transmit the information. If the second communication link is used, the method proceeds to step 530 where the hybrid medium controller may embed the information in a packet and adds labels, e.g., to identify the origin of the information, the type of information, the priority level and the required protection. The method then proceeds to step 540 by using the second local transceiver to transmit the packet containing the information using the appropriate priority level and protection.

Figure 5B:
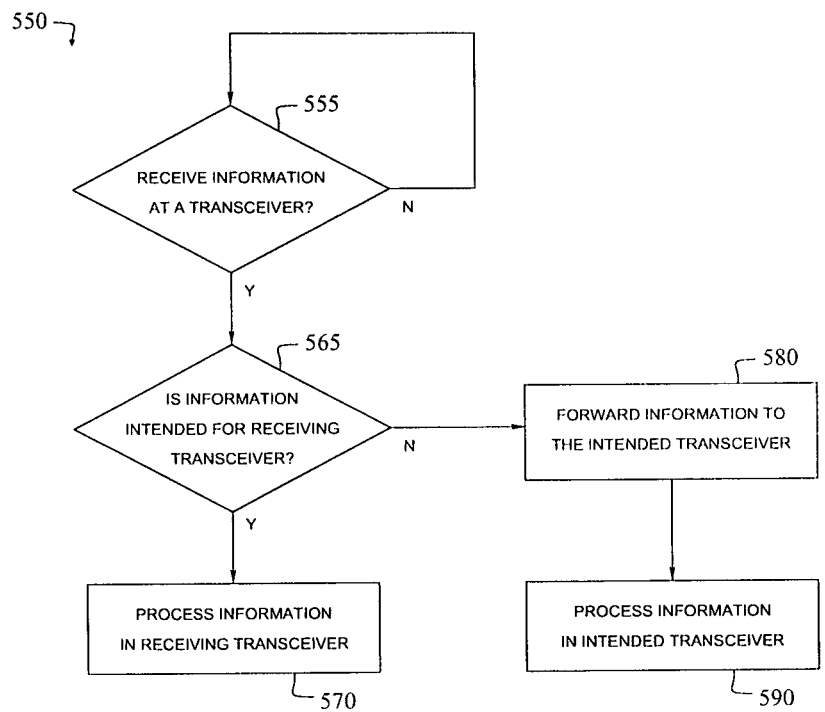
FIG. 5B illustrates a method of operating a pair of transceivers in response to receiving information from a remote terminal according to an example embodiment.

FIG. 5B illustrates an example embodiment of step 420 illustrated in FIG. 4. More specifically, FIG. 5B illustrates a method 550 of operating the pair of local transceivers in response to receiving information from the remote terminal according to an example embodiment. In step 555, the receiving transceiver of the pair of local transceivers determines whether there is any incoming information from the remote terminal. If this is the case, the method proceeds to step 565 where the received information is inspected to determine the destination. The inspection may also include determining the type of information. If the information is intended for the local receiving transceiver, the method proceeds to step 570, and the information is processed in the local receiving transceiver. If the information is not intended for the local receiving transceiver, the method proceeds to step 580, and the information is forwarded to the intended local transceiver through the hybrid medium controller. In step 590, the information is processed in the intended local transceiver.

Figure 6:
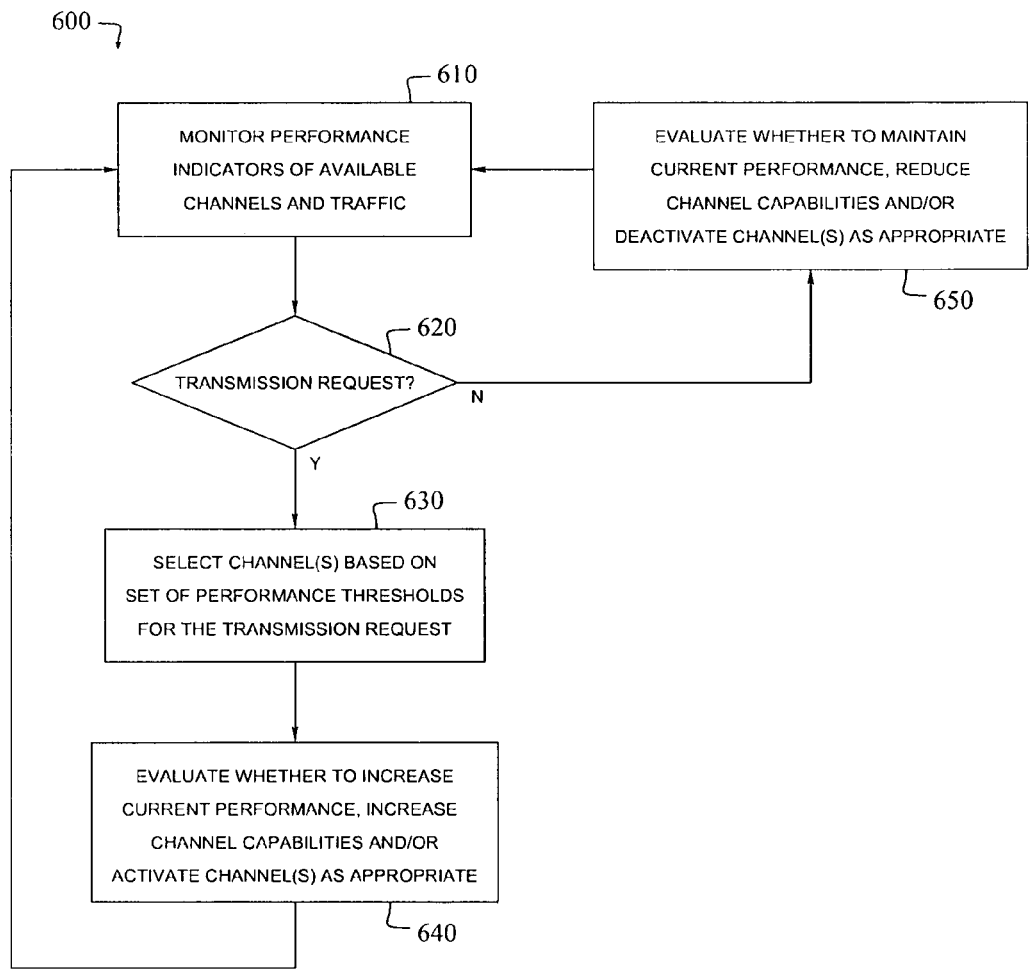

FIG. 6 illustrates an example embodiment of step 410 illustrated in FIG. 4. More specifically, FIG. 6 illustrates a method 600 of operating the pair of transceivers in response to a transmission request according to an example embodiment. At step 610, the pair of local transceivers monitors the performance indicators of available channels as well as the amount of traffic at least one of the pair of local transceivers is processing. The available channels include both control and data channels.

As stated above, the performance indicators may be data driven and/or based on channel conditions. Local controllers (e.g., the first and second local controllers 335 and 345) of the local transceiver and a second local transceiver connected to the hybrid medium controller may provide access to both regular data channels and control channels. Each of these channels may have different link performance indicators such as different robustness, data rates, reliability (e.g., bit error rate) and/or latency.

The hybrid medium controller monitors the internal state of the local transceivers as well as internal performance measures using the hybrid medium controller. For inactive channels, the hybrid medium controller may keep a database with transceiver performance characteristics as well as historical channel characteristics. The database is useful in determining whether or not to activate a transceiver in response to a given transmission request. The LMTU may also periodically probe the channels to determine the channel availability and the channel characteristics.

At step 620, the pair of local transceivers checks for a transmission request for communication to the remote terminal. If such a transmission request is made, the hybrid medium controller proceeds to step 630 by selecting channel(s) based on a set of performance thresholds for the transmission request.

The set of performance thresholds are based on the performance indicators. The performance indicators may be used to determine whether any of the corresponding set of performance thresholds is not met and whether the (anticipated) performance is above/below a threshold. For example, latency, reliability, fast error recovery and any combination of the performance indicators may be used. For example, channels of both the first communication link and second communication link may be selected by the hybrid medium controller if the performance is below a performance threshold (e.g., high traffic demand). In another example, a channel of one of the first and second communication link may be selected if the performance is above a performance threshold (e.g., low traffic demand).

The transmission request may be an external transmission request, e.g., prompted by arriving user data, or an internal transmission request, e.g., prompted by an internal request to communicate (control) information to the remote terminal or to retransmit information after an acknowledgement time-out or upon the remote terminal's request. Prompted by the transmission request, the hybrid medium controller may decide to boost a currently active channel by allocating more resources if available, or to activate a link.

At step 640, the hybrid medium controller evaluates whether to increase channel performance, increase channel capabilities and/or activate channel(s) as appropriate based on at least one performance indicator, after which it returns to step 610. This may involve various new transmission requests and iterations.

There may be an anticipation component in evaluating whether to increase channel capabilities and/or activate channel(s) as appropriate. For example, the hybrid medium control may know the application being used (e.g., a user watching a high-definition channel) and may then factor the application being used into a set of performance thresholds being used as well as a cost determination. Therefore, when a user decides to perform a quick channel change, the hybrid medium controller may provide an almost instantaneous increase in bandwidth (by establishing or expanding the second communication link, as described below) as buffers containing the old stream become useless and there is often not enough data in the buffers at first to create the new stream from the (compressed) data.

If there are no transmission requests, the hybrid medium controller proceeds from step 620 to step 650, which evaluates whether to maintain the current performance, reduce channel capabilities and/or deactivate channel(s) as appropriate based on at least one performance indicator, after which it returns to step 610. For example, if there is not a transmission request, the hybrid medium controller may decide to deactivate the active channel(s).

Figure 7:
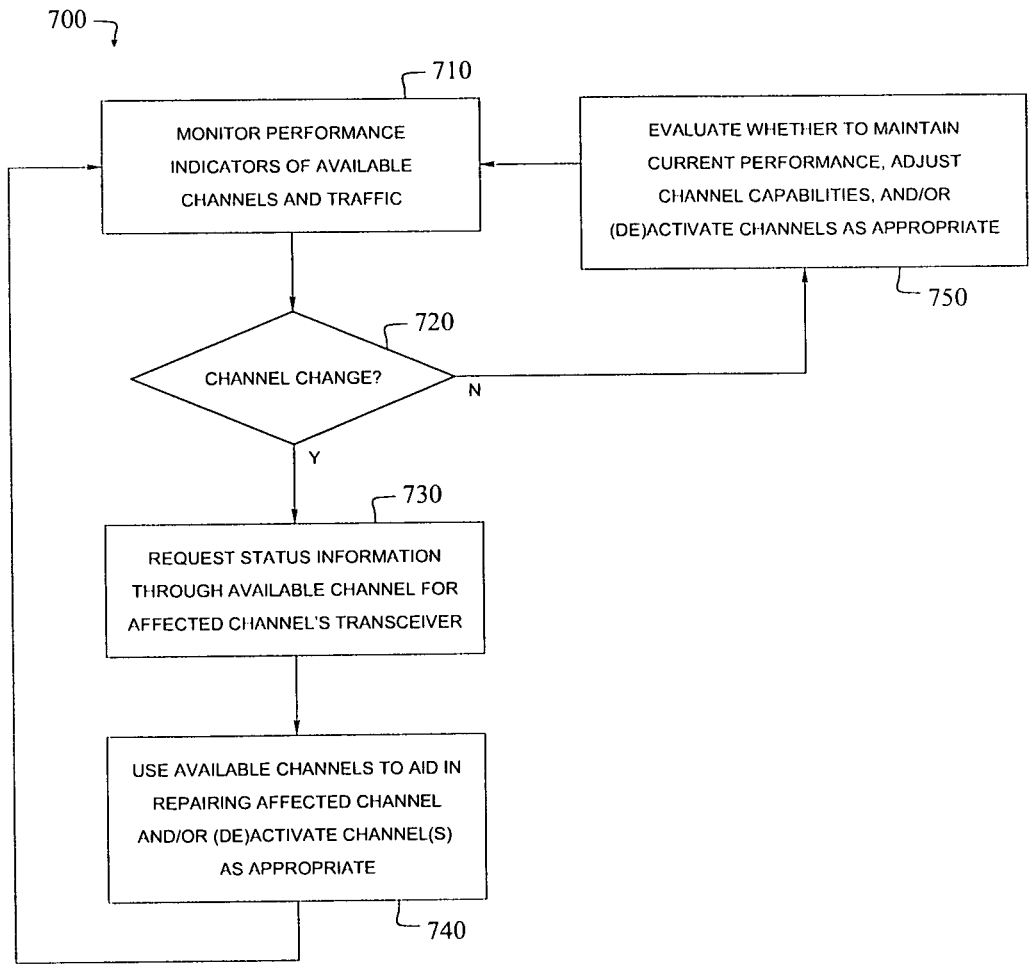

FIG. 7 illustrates an example embodiment of step 410 illustrated in FIG. 4. More specifically, FIG. 7 illustrates a method 700 of operating the pair of local transceivers in response to a change in channel performance according to an example embodiment. In step 710, the pair of local transceivers monitors the performance indicators of available control and data channels as well as the amount of traffic the pair of local transceivers are processing. The performance indicators have been described above with reference to FIGS. 5A and 6. Therefore, for the sake of clarity and brevity, a description of the performance indicators is not provided here.

At step 720, the pair of local transceivers checks for a (sudden) change in one or more of the performance indicators (e.g., channel quality, throughput, and/or latency due to error bursts, fades, interference, and/or impulse noise). The hybrid medium controller can at least see whether there are a lot of transmission errors or whether there is no signal at all. If an active channel is down, the hybrid medium controller communicates the control information (e.g., low-level control information) to the remote terminal over a channel that is not down.

If such a change occurs, the hybrid medium controller proceeds to step 730 by requesting status information through available channel(s) to determine the state of the affected channel's transceiver. For example, if the first communication link goes down the hybrid medium controller may use the second communication link to determine the state of the first local and remote transceivers and the affected channel.

The method then proceeds to step 740 by using the available channels to aid in repairing the affected channel or to mitigate the impact of the change in performance of the affected channel and/or (de)activate channel(s) as appropriate. The method then proceeds to step 710 to monitor the performance information and the amount of traffic the pair of local transceivers are processing.

If no changes in the channel are observed, the method proceeds from step 720 to step 750 where the hybrid medium controller evaluates whether to maintain the current performance for the current (and anticipated) amount of traffic, adjust the performance and/or activate or deactivate channels as appropriate, after which the method returns to step 710.

Figure 8:
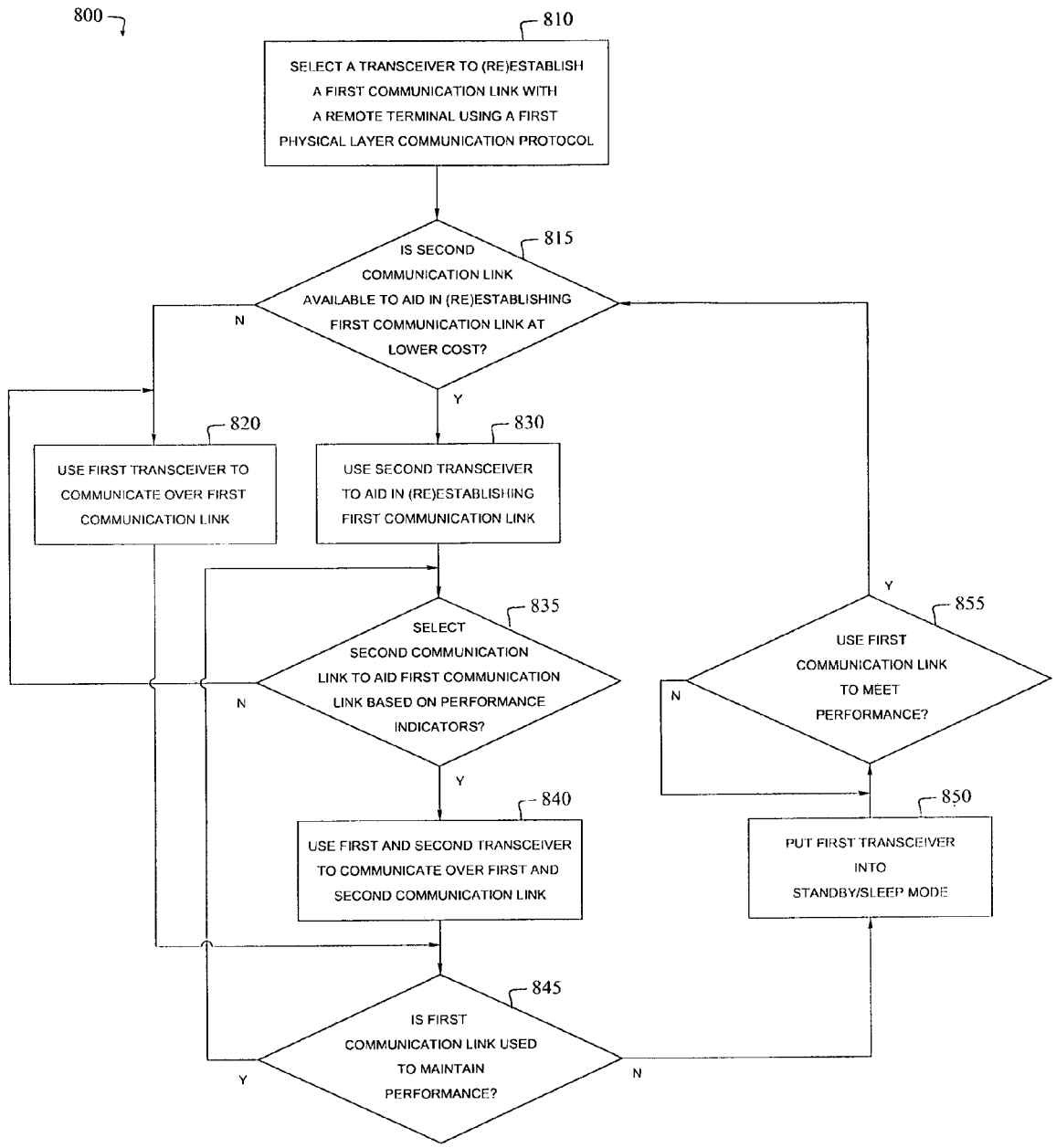

FIG. 8 illustrates a method 800 of activating and deactivating transceivers in a pair of local transceivers according to an example embodiment of FIG. 4.

At step 810, the hybrid medium controller selects a first transceiver to (re)establish a first communication link with a remote terminal using a first physical layer communication protocol. Low-level control information is communicated to the remote terminal to establish the first communication link and initialize a communication session.

To establish the first communication link, the hybrid medium controller may evaluate which available link best supports the current (and (near) future) requests based on the application(s) and data stream characteristics, for example. In one example, a security monitoring system sends a "heartbeat" or a smart meter sends a "status info" request to the hybrid medium controller. The hybrid medium controller would determine which link and associated local transceiver can handle such light, bursty traffic, and after use of the determined local transceiver, put the determined local transceiver in a standby/sleep-mode.

If, however, an in-the-field software update is initiated, or the LMTU sends or receives a lot of data, the second communication link may be used, as described below in more detail. Moreover, sudden problems with a link may be resolved faster through another link (e.g., the second communication link), which is not directly an "amount of data" trigger. For example, in VDSL2, impulse noise protection may cause the local transceivers to have significant delays due to the overall length of their internal interleavers. For some data which requires low latency, the delays could trigger the use of the other communication link. If the only application is "downloading a long high-definition video" at some point during the night without any latency or throughput constraints, the hybrid medium controller may select the "cheapest link" or the "greenest link" or, use a weighted combination of performance indicators (e.g., latency and throughput constraints) to decide which link(s) to activate.

In the method illustrated in FIG. 8, the first communication link is initially selected. However, FIG. 8 should not be limited as such and it should be understood that the hybrid medium controller may initially select two communication links. Or, the second communication link may initially be selected.

In the case where the second communication link is selected, the second communication link would be the first communication link illustrated in FIG. 8. Based on the description below, one of ordinary skill in the art would understand how the method is implemented if the second communication link is selected because the functionality of the first and second communication links would be switched.

Once the communication session is established over the first communication link, information is transferred between the local transceiver and the remote terminal.

In step 815, the hybrid medium controller evaluates whether a second communication link is available to aid in (re)establishing the first communication link at a lower cost than when it would solely use the first communication link. The hybrid medium controller performs scheduling operations, e.g., using a set of performance thresholds and various cost functions which are based on performance indicators. Local controllers (e.g., the first and second local controllers 335 and 345) of the local transceiver and a second local transceiver connected to the hybrid medium controller may provide access to both regular data channels and control channels. The performance indicators have been described with reference to FIGS. 5A and 6 and, therefore will not be described in greater detail for the sake of clarity and brevity.

Based on at least one cost function, the hybrid medium controller may decide whether to use the second communication link to aid in (re)establishing the first communication link.

If the second communication link is available at a lower cost, the method proceeds to step 830, where the second communication link is used to exchange information (e.g., low-level control information) between the first local transceiver and the first remote transceiver to aid in (re)establishing the first communication link. The hybrid medium controller may embed the information in a packet and add labels, e.g., to identify the origin of the information, the type of information, the priority level and the required protection and forward the information to the second local transceiver for forwarding to the remote terminal over the second communication link. For example, the low-level control information for the first communication link may be transmitted over the second communication link and used by the hybrid medium controller to aid in updating communication parameters of a communication session over the first communication link and selectively schedule transmission of data between the first and second local transceivers.

If there is a higher cost of using the second communication link, the first local transceiver and the first remote transceiver proceed to (re)establish the first communication link without aid from the second local and remote transceivers at step 820. After the first transceiver is used to (re)establish the first communication link and communicate over the first communication link, the hybrid medium controller determines whether the first communication link is to be used to maintain performance at step 845. Step 845 is described in more detail below.

After steps 830 and 845, the hybrid medium controller determines whether a second communication link is available to aid operating the first communication link based on the performance indicators, and whether the performance indicators exceed a performance threshold, at step 835. The hybrid medium controller monitors the communication performance over the first communication link based on various performance indicators, which may be updated periodically.

If there is a lower cost (e.g., current communication capabilities are above a performance threshold) of using the first and second local transceivers to communicate over the first and second communication links, then the hybrid medium controller schedules transmission of information over both the first and second communications links at step 840.

For example, if the amount of data being transferred is low (e.g., communication capabilities are below a performance threshold), the hybrid medium controller selects the second local transceiver to use the second communication link with the remote terminal at step 840. The second communication link aids in operating the first communication link. The second communication link uses a second physical layer protocol which may be different than the first physical layer protocol or the same as the first physical layer protocol, but operating on a different frequency.

It should be understood that the amount of data is just one performance indicator that may be used to determine whether the (anticipated) performance is above a performance threshold. For example, latency, reliability, fast error recovery and any combination of the performance indicators may be used.

As described in the description of FIG. 6, there may be an anticipation component in determining whether the performance will be above a performance threshold. For example, the hybrid medium control may know the application being used (e.g., a user watching a high-definition television channel) and may then factor the application being used into set of performance thresholds being used as well as the cost determination. Therefore, when the user decides to perform a quick (television) channel change, the hybrid medium controller may provide an almost instantaneous increase in bandwidth (by establishing or expanding the second communication link, as described below) as buffers containing the old stream become useless and there is often not enough data in the buffers at first to create the new stream from the (compressed) data.

After the first and second transceivers are used to communicate, the hybrid medium controller determines whether the first communication link is being used to maintain performance at step 845. The hybrid medium controller may use the set of performance thresholds and various cost functions which are based on performance indicators to determine whether the first communication link is being used to maintain performance. For example, if the amount of data to be transferred is high (e.g., the current communication capabilities are below a performance threshold), the hybrid medium controller continues to monitor and control the first and second communication links.

The hybrid medium controller may control a communication link based on low-level control information in the same manner as described above with reference to the hybrid medium controllers 320 and 360 as illustrated in FIG. 3 or the hybrid medium controllers 120 and 160 as illustrated in FIG. 1. Thus, for the sake of brevity, the description of controlling a communication link based on low-level control information will not be repeated.

If the first communication link is not being used to maintain performance, then the first transceiver is put into a standby/sleep mode by the hybrid medium controller at step 850. For example, if the amount of data is low (e.g., the current capabilities are well above a performance threshold), the hybrid medium controller may put the first transceiver into the standby/ sleep mode.

If the first communication link is being used to maintain performance, then the hybrid medium controller proceeds to step 835.

Once the hybrid medium controller places the first transceiver in the standby/ sleep mode, the hybrid medium controller monitors whether the first communication should be used to meet performance based on the performance indicators at step 855. If the first communication link should be used at step 855, the hybrid medium controller proceeds to step 815.

While not all possible states of the first and second communication links are illustrated, the possible states should be understood from the above description of FIG. 8. For example, both the first and second communication links may be in a sleep/standby mode.

Example embodiments being thus described, it will be obvious that the same may be varied in many ways. For example, a fixed access network may operate as a high-speed backbone network of the wireless network and wireless access points installed at RTs could be used as relays in the wireless network. The fixed access network may form a star network; where as the wireless network superimposes the star network and also provides extra connections between RTs.

Furthermore, data or low-level control information may be transferred over a mid-level layer in the OSI stack. For example, an interface may provide low-level control information or data to a higher level in its own transceiver stack and the data or low-level control information may be transferred to the same in layer in the wireless interface. The functionality of the local controllers (e.g., local controllers 135 and 145) would then be performed in the interfaces (e.g., interfaces 132 and 142), respectively.

Such variations are not to be regarded as a departure from the spirit and scope of the example embodiments, and all such modifications as would be obvious to one skilled in the art are intended to be included within the scope of the claims.

What is claimed is:

1. An apparatus comprising:
   at least two local transceivers; and
   a controller connected to control the two local transceivers and configured to establish parallel first and second communication links with a remote terminal via at least one of the two local transceivers such that the first communication link uses a first physical layer communication protocol and the second communication link uses a second physical layer communication protocol, the second physical layer communication protocol being different from the first physical layer communication protocol or the first and second transceivers configured to operate on different frequencies, wherein the controller is configured to cause the two local transceivers to communicate only control information to the remote terminal over the first communication link, the control information for use in controlling a communication session over the second communication link, the control information being at least one of power requirements, signal constellation information, framing parameters, error control and link quality measurements.

2. The apparatus of claim 1, wherein the control information is for use in initializing a communication session over the second communication link.

3. The apparatus of claim 1, wherein the control information is for use in updating parameters for a communication session over the second communication link.

4. The apparatus of claim 1, wherein the controller is configured to selectively schedule transmission of information for a communication session over the second communication link.

5. The apparatus of claim 1, wherein the control information is physical layer control information.

6. The apparatus of claim 5, wherein the controller is configured to provide the physical layer control information from one of the two local transceivers to another of the local transceivers.

7. An apparatus comprising:
   at least two local transceivers, at least one of the two local transceivers including,
      an interface configured to establish parallel first and second communication links with a remote terminal via at least one of the two local transceivers such that the first communication link uses a first physical layer communication protocol and the second communication link uses a second physical layer communication protocol, the second physical layer communication protocol being different from the first physical layer communication protocol or the first and second transceivers configured to operate on different frequencies, wherein the controller is configured to cause the two local transceivers to communicate only control information to the remote terminal over the first communication link, the control information for use in controlling a communication session over the second communication link, the control information being at least one of power requirements, signal constellation information, framing parameters, error control and link quality measurements.

8. A method of operating a pair of local transceivers, comprising:
transmitting information to a remote terminal from the pair of local transceivers to establish parallel first and second physical layer communication links using a first physical layer protocol and a second physical layer protocol, respectively, the second physical layer communication protocol being different from the first physical layer communication protocol or the pair of local transceivers configured to operate on different frequencies, the transmitting including,
transmitting only control information originating from the second transceiver for use in controlling a communication session over the second physical layer communication link; and
receiving information from the remote terminal by the pair of local transceivers, the control information being at least one of power requirements, signal constellation information, framing parameters, error control and link quality measurements.

9. The method of claim 8, wherein the transmitting includes
transmitting the control information originating from the second physical layer link over the first physical layer communication link to use in establishing the second physical layer communication link.

10. The method of claim 9, wherein the transmitting includes
transmitting the control information to use in updating parameters for a communication session over the second physical layer communication link.

11. The method of claim 9, wherein the transmitting includes
transmitting the control information to selectively schedule transmission of information between the pair of local transceivers.

12. The method of claim 8, wherein the receiving includes:
receiving the information from the remote terminal by one of the pair of local transceivers;
determining whether the information received from the remote terminal is intended for the receiving transceiver; and
processing the information from the remote terminal in the intended transceiver.

13. The method of claim 8, wherein the transmitting includes
transmitting the information over the second physical layer communication link based on an amount of information to be transmitted to the remote terminal.

14. The method of claim 8, wherein the transmitting includes
transmitting the information over the second physical layer communication link based on latency over one of the first and second physical layer communication links.

15. The method of claim 8, wherein the transmitting includes
transmitting the information over the second physical layer communication link based on an error rate over one of the first and second physical layer communication links.

16. The method of claim 8, wherein the transmitting includes
transmitting the information from one of the pair of local transceivers based on at least a link performance indicator.

17. The method of claim 8, wherein the transmitting includes
forwarding the information from one of the local transceivers to another of the local transceivers for transmission therefrom to the remote terminal.

18. The method of claim 8, wherein the transmitting includes:
detecting a deterioration in a channel of one of the pair of local transceivers; and
transmitting a request to the remote terminal by another of the pair of local transceivers for information on the deterioration.

* * * * *